FIG. 10

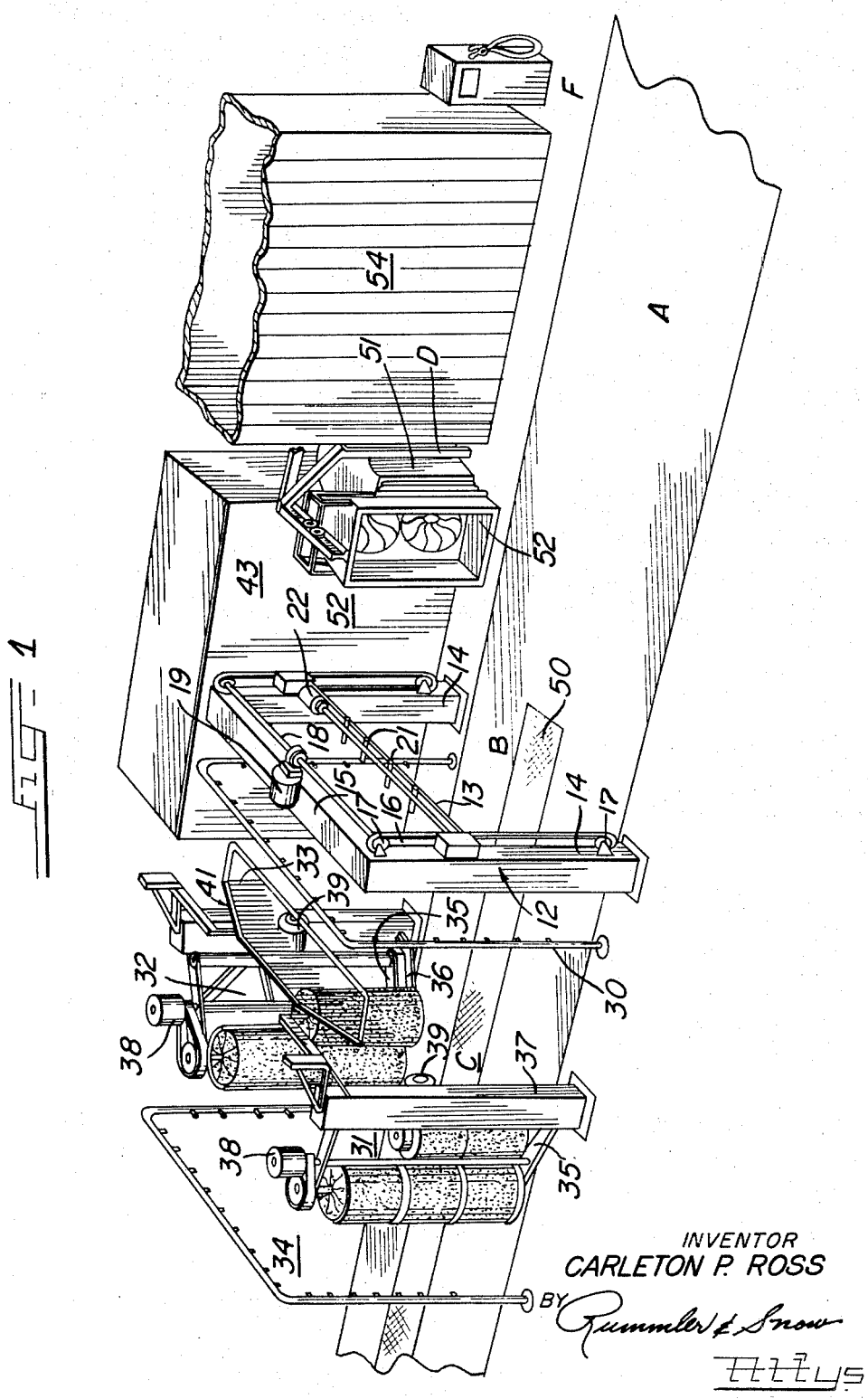

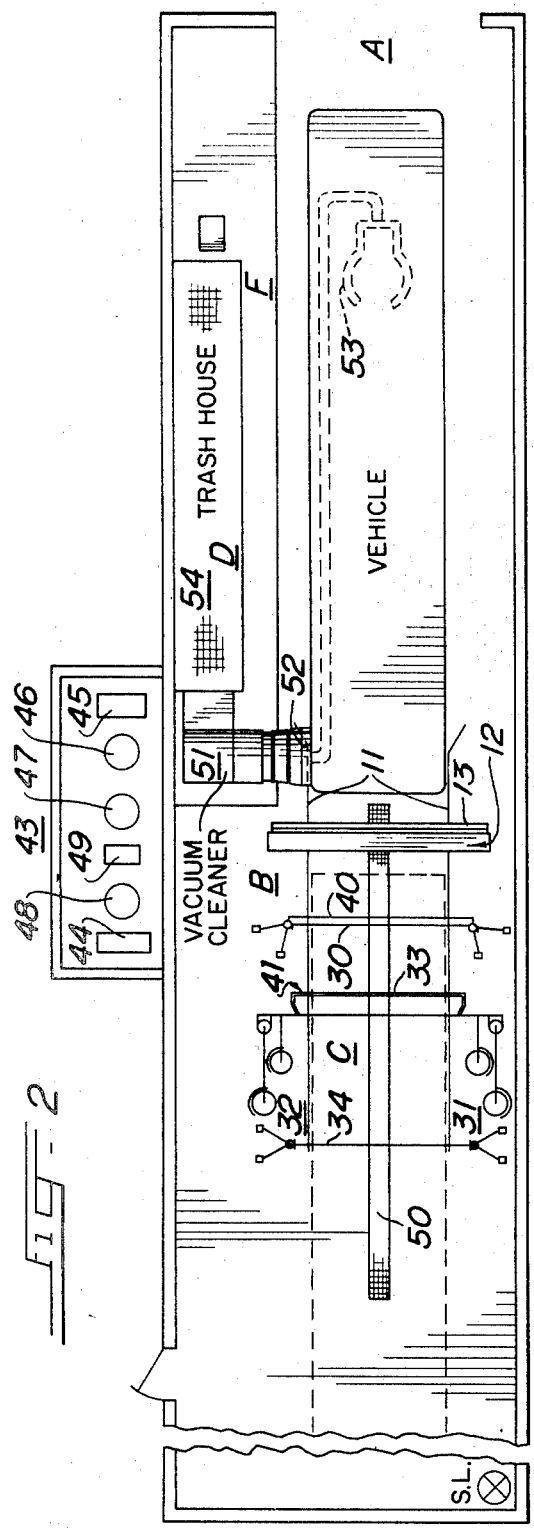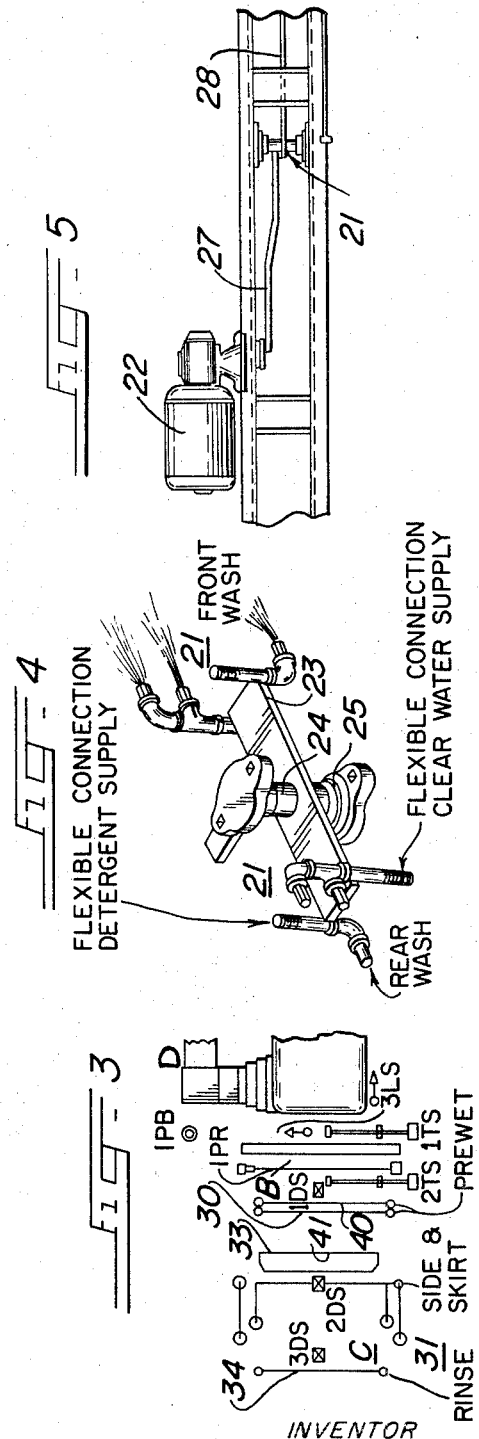

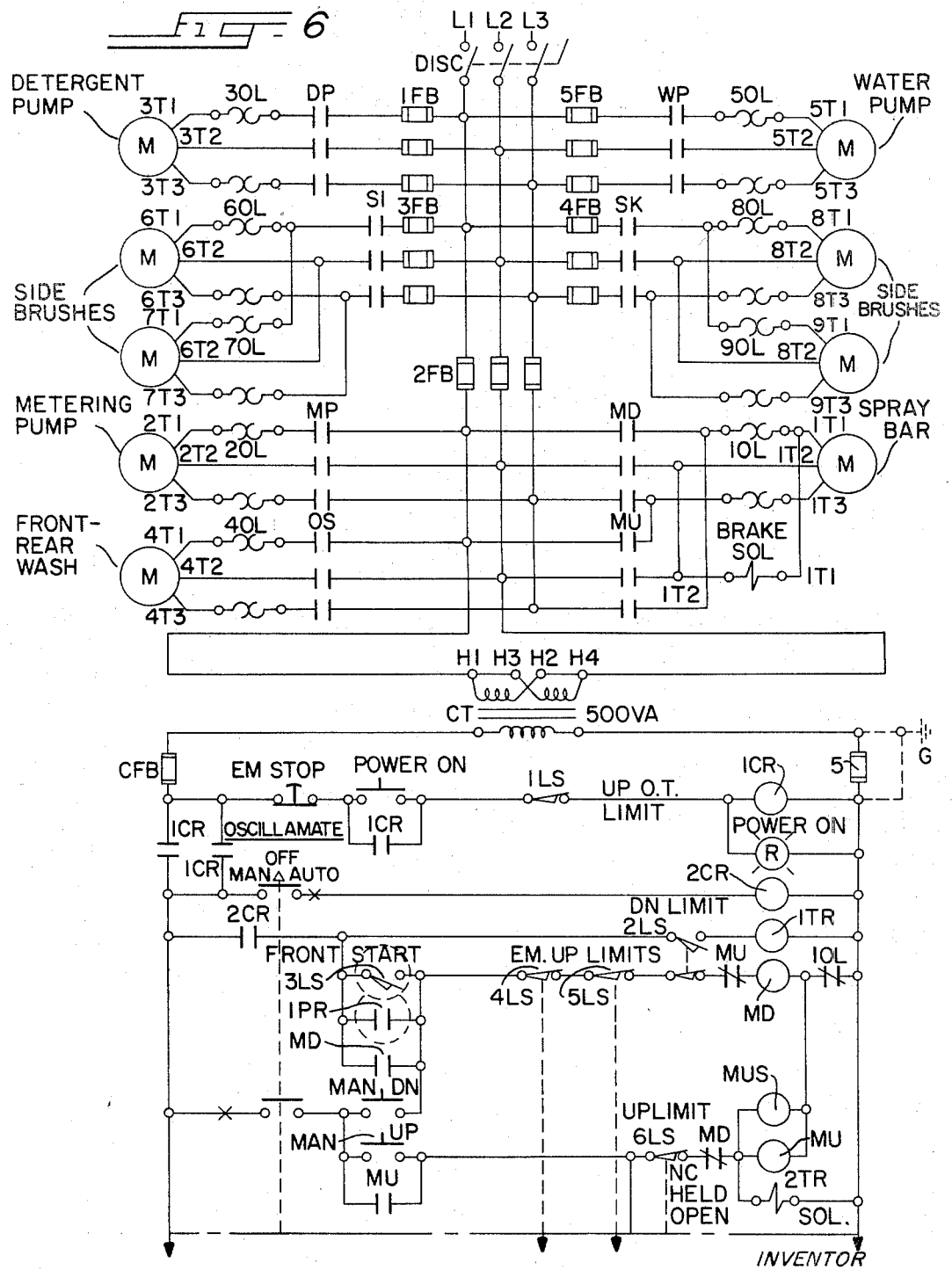

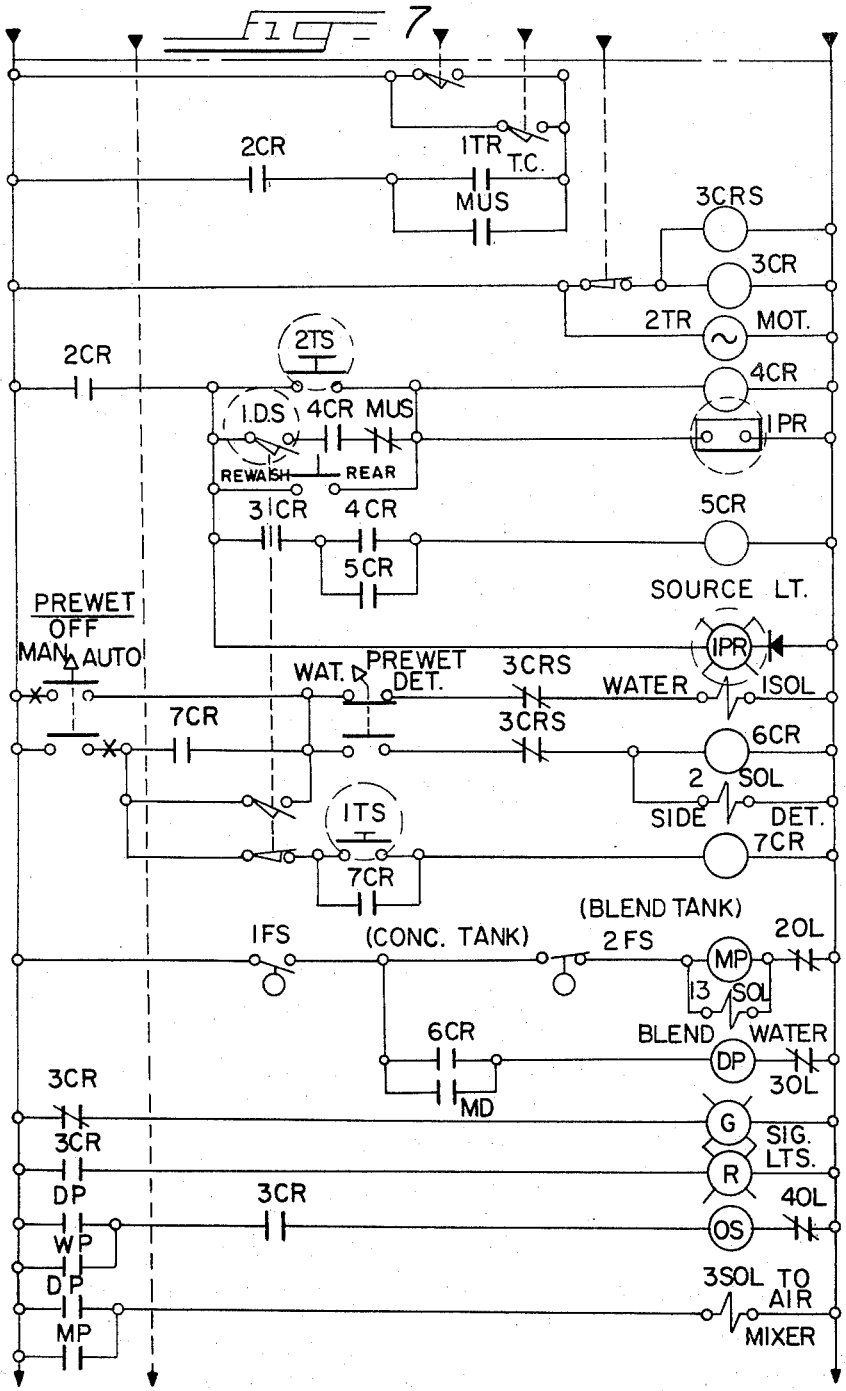

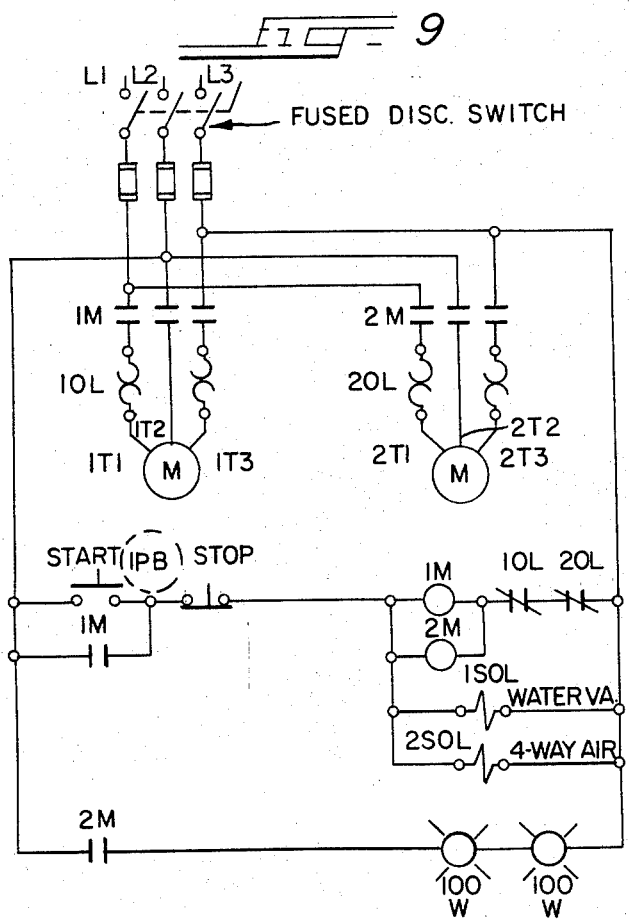

| LEGEND | |
|---|---|
| SYMBOL | DESCRIPTION |
| DISC. | DISCONNECT SWITCH |
| 1,2 FB. ETC. | FUSE BLOCKS - POWER |
| CFB | FUSE BLOCK - CONTROL |
| 1,2OL, ETC | OVERLOAD RELAYS |
| SI | SIDE WASHER STARTER |
| SK | SKIRT WASHER STARTER |
| DP | DETERGENT PUMP STARTER |
| MP | METERING PUMP STARTER |
| WP | WATER PUMP STARTER |
| OS | OSCILL. MOTOR STARTER |
| MU, MD | OSC. HOIST MOTOR STARTER |
| IM, 2M | BUCK CL. MOTOR STARTERS |
| CT | CONTROL TRANSFORMER |
| 1,2LS, ETC. | LIMIT SWITCHES |
| 1,2 TS, ETC. | TREADLE SWITCHES |
| 1,FS, 2 FS | FLOAT SWITCHES |
| 1,2 DS, ETC. | DANGLE SWITCHES |
| 1, 2 SOL, ETC. | SOLENOID VALVES |
| 1,2 CR, ETC. | CONTROL RELAYS |
| 1,2 TR, ETC. | TIMING RELAYS |
| MUS | MU SLAVE RELAY |
| 3 CRS | 3 CR SLAVE RELAY |
| IPB | BUCK CL. START-STOP PUSHBUTTON |
| SIG. LTS. | SIGNAL LIGHTS |
| | |

INVENTOR.
CARLETON P. ROSS
BY

United States Patent Office 3,402,419
Patented Sept. 24, 1968

3,402,419
VEHICLE CLEANING SYSTEM
Carleton P. Ross, Wheeling, Ill., assignor to Ross and White Company, Wheeling, Ill., a corporation of Illinois
Filed Jan. 10, 1966, Ser. No. 519,666
7 Claims. (Cl. 15—302)

ABSTRACT OF THE DISCLOSURE

A system for washing buses including a service lane thru which the bus must travel between two stop "stations" for exposure to the synchronized exterior washing and interior vacuuming thereof by facilities and equipment arranged for seriatim work on the bus.

---

This invention relates to the cleaning of public passenger vehicles, especially busses.

In these times of high labor and material costs and the demand for effecting the desired results with less expenditure of time and the use of personnel, there is a constant endeavor to expedite all kinds of operations that have to do with the making or using of all kinds of facilities. So it is with the requirements for the frequent cleaning of vehicles used for the public transportation of people. Constantly, endeavors are being made to improve, reform and/or reorganize equipment for that purpose.

The main objects of this invention are; to provide an improved system for the synchronized cleaning of passenger vehicles, especially of the motor driven type; to provide an improved system of this kind wherein the juxtaposed equipment permits the exterior spraying of detergent-mixed and rinsing-water sprays concurrently with the interior collection of dust and particles; to provide a system of this kind wherein the equipment is of such structure as to make relatively economical the manufacture and installation thereof and make highly efficient and gratifying the use thereof.

In the adaptation shown in the accompanying drawings;

FIG. 1 is a perspective of the system showing the general juxtaposed arrangement of the brush-and-spray exterior-cleaning mechanisms and the interior dust-and-particle collecting-means;

FIG. 2 is a diagrammatic plan view of the system shown in FIG. 1, with a vehicle indicated in full and dotted lines in the front and rear cleaning position;

FIG. 3 is a very simple plan schematic of the arrangement of the major circuitry-control mechanisms which are activated incident to the movement of a vehicle onto, along and off from the service lane;

FIG. 4 is a perspective view of one of the reciprocable nozzle devices on the vehicle front-and-rear washing facility;

FIG. 5 is a perspective view showing the connections of the spray nozzles to its driving motor and to each other for concurrent reciprocable movement;

Figure 8:
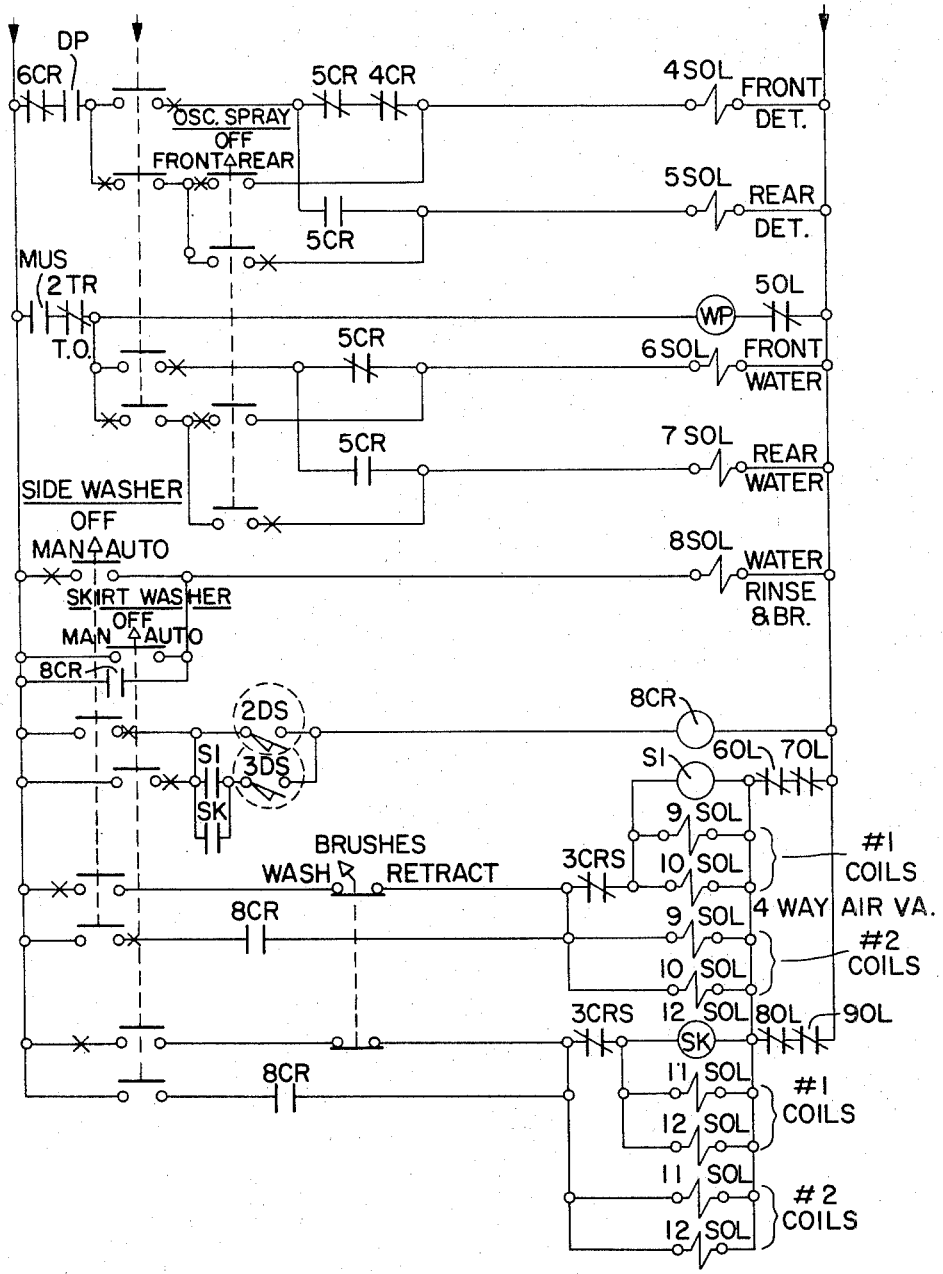

FIGS. 6, 7 and 8, when placed end-to-end in that order, constitute the complete layout of the circuitry and incorporated components that control the functioning of the several facilities of this system for the exterior cleaning of a vehicle by this system;

FIG. 9 is a layout of the circuitry and incorporated components that control the functioning of the dust-and-particle collecting means for the interior cleaning of a vehicle by this system; and FIG. 10 is a chart that identifies the components indicated in abbreviated form in the other figures.

A system for the synchronized exterior and interior cleaning of a vehicle embodying the foregoing concept comprises a service-lane A, whereon is perimetrically-arranged the front-and-rear exterior washing facility B, the side and roof exterior washing facility C and the dist-and-particle collecting means D, the synchronizing functioning of which is controlled by a component-regulated circuitry E manually and/or automatically activated, and wherewith may be associated other conventional vehicle-servicing facilities F, as may be found desirable or expedient.

The service-lane A here shown is defined by appropriately spaced parallel tire-wheel guides 11 curved slightly outward at the entrance end of the lane, as shown in FIG. 2. Preferably this lane A would be conventional concrete construction for the advance of vehicle onto, along and off from under its own power. Or, the lane A could incorporate a conventional form of conveyor appropriately operable to advance and arrest the vehicle once driven onto such a conveyor. The lane A provides for two "stop stations" whereat the front and rear exterior cleaning is effected and at one of which "stations" the interior cleaning is simultaneously effected and between which stations the exterior sides and rear of the vehicles are cleaned. At a forward-most point on the left-hand side of the lane, is arranged a signal light SL for monitoring the movement of a vehicle along the lane.

The front-and-rear washing facility B comprises an inverted U-frame 12 mounting a vertical shiftable spray bar 13. The frame 12 uprights 14 are anchored at the opposite sides of the lane A with the cross-part 15 spaced above the lane A a suitable distance to permit passage thereunder of the type of vehicle for use with which the system has been designed and structured.

The spray-bar 13, as herein shown, is secured at its ends to chain-means 16 operating over sprockets 17 the upper pair of which are keyed to a shaft 18, journaled on the frame 12, and driven by a motor 19. On the spray bar 13 is journaled a series of reciprocating spray nozzles 21 spaced uniformly along the bar 13. These spray nozzles 21 are journaled on the bar 13 for reciprocation through an angle of approximately 75 degrees (FIG. 4). A plurality of such nozzles 21 are interconnected by link or cable-means to a motor 22 (FIG. 5).

As shown in FIG. 4 a dual and single set of spray nozzles 21 are secured at the opposite ends of a plate 23. The plate is secured to a stud shaft 24 journaled in bearing 25. A pitman 27 (FIG. 5) connects an eccentric on the motor 22 to the plate 23 on the nearest set of nozzles 21 to effect their reciprocation. Links 28 connect the plates 23 on successive sets of nozzles 21 so that all sets of nozzles are reciprocated simultaneously.

As noted in FIG. 4 each pair of nozzles 21, at the oppposite ends of the plate 23, has a flexible connection to one or the other of two sources of liquid supply, as will be explained presently.

The spray bar 13 is moved successively down and up on the frame 12. During the down movement, by the motor 19 connected to the chain means 16, these oscillating nozzles 21 discharge a detergent spray and during the upward movement discharge a rinsing spray, as later will be explained in further detail.

The side-and-roof washing facility C comprises a pre-wet arch 30, pairs of side brush units 31 and 32, a roof mop 33 and a rinse arch 34.

The pre-wet arch 30 here is shown as an inverted U-shaped pipe secured at the ends of the paralled sections permetrically of the lane A, somewhat in advance of the front-and-rear washing facility B. A series of nozzles arranged along the upright parallel sections and the transverse overhead section direct water against the sides and roof of a vehicle during its forward movement beyond the facility B.

The pair of brushes 31 and 32 are journaled on pairs of vertically-spaced arms 35 and 36 hinged to stanchions 37 which are anchored at their lower ends at opposite perimeters of the lane A. One brush of each pair is of a length substantially that of the height of the vehicles that normally are to be washed in their movements along the lane A. These may be designated as the "side" brushes. The other brush of each pair is much shorter than the one brush. These latter are structured for contact with the lower side portions of the vehicle and may be designated as "skirt" brushes.

The respective pairs of brushes 31 and 32 are belt-driven by individual motors 38 and 39. Such pairs of brushes 31 and 32 are biased by air cylinders (not shown) for pressured contact with the sides of a vehicle as it advances along the lane A from the first "stop station" to the "second." Adjacent to prewet spray is a nozzled spray pipe symbolically indicated by 40 (FIG. 2) which supplies the detergent or water during the advance of the vehicles along the lane A preselected at the option of the operator prior to the start of the operation.

The roof mop 33 comprises a supporting frame 41 here shown secured to the stanchions 37 and from one longitudinal portion of which is suspended a curtain 33 of heavy absorbent material. This is positioned so as to wipe along the roof of the vehicle as it advances along the lane A.

The rinse spray 34 is an inverted U-shaped pipe secured at the ends of the parallel sections perimetrically of the lane A in advance of the brush units 31 and 32. A series of nozzles along the upright sections and the overhead connection section direct a water spray against the exterior of the vehicle as it advances along the lane A in a manner that will later be explained more fully.

The detergent-mixed and clear-water pressured-supply for these exterior washing facilities B and C is provided from specially-arranged equipment in a housing 43 located adjacent one side of the lane A. Such equipment is diagrammatically symbolized in FIG. 2. It involves a detergent water-mix pump 44, clear-water pump 45, a heater 46, a concentrate detergent tank 47, a blending tank 48 and a metering pump 49.

The lane A is equipped with a grate covered drain 50 to direct these sprays to a suitable sewer connection.

These above-described exterior washing facilities B and C are bruoght into their desired functioning sequence by components in the hereinafter described circuitry E. Some such components are symbolically indicated in FIG. 3. These include a 1PB pushbutton switch, a 3LS pull-cord switch, 1TS and 2TS treadle switches, a 1PR photo-ray circuit-control, and 1DS, 2DS and 3DS dangle switches. The functioning manner and results of these components will be explained presently.

The dust and particle collecting means D comprises a cyclone type vacuum unit 51, an accordian-form of vehicle door-opening embracing hood 52, a supplemental multiple-nozzled compressed-air hose 53 and a trash house 54. The form and arrangement of such a means is substantially as shown in the Buck Patent No. 2,677,629, issued May 4, 1954. The manner of its use in this system will be amplified later herein.

The other service facilities F, arranged along the lane A, might involve several units, such as are characteristic of motor-vehicle service stations. However, here only a fuel pump is symbolized in FIG. 1.

In the operation of this system for synchronized exterior and interior cleaning of a vehicle, one or two persons, or perhaps sometimes, three persons can be involved more or less simultaneously. This generally would depend upon the number of vehicles requiring cleaning in a given period of time. The following explanation, making reference to FIGS. 2 and 3, is based on the use of two persons with the understanding that under appropriate circumstances one person might be used to carry out the sequence of operations, obviously, in a greater period of time than achieved by two persons.

The first person moves the vehicle, from the driver's dropping off point, onto the lane A and up to the first "stop position" as indicated by full outline of FIG. 2. This person then would depress the 1PB (push button) to activate the suction cleaner simultaneously and shift the embracing hood over the open front door of the vehicle. He then opens the front and rear doors of the vehicle and the rear windows. He then picks up and disposes of the debric—bottles, cups, etc.—too heavy to be picked up by the suction of the cleaner and discharges such debris out the rear door or windows.

If the over-all circumstances require, this first person (or another) will take the air hose and gun from a hook inside of the door-opening embracing-hood and move to the rear of the vehicle. From that point he will move forward with the air pressured stream directed against the interior surfaces of the vehicle, including the seats, walls and floor, to force the dust and particles into the suction stream from the cleaner for discharge into the trash receptacle. However, it should be understood that the suction draft from the cleaner is normally and substantially of such force that on occasions it will effect a satisfactory cleaning of the vehicle.

Meanwhile, the other person inserts the automatic fuel nozzle into the fuel tank opening, if fuel is needed. He then pulls the cord for the 3LS switch to activate the front-and-rear end washing unit 6 to effect the cleaning of the front of the vehicle.

Once started by pull cord 3LS the red signal light turns on to caution the first person not to move vehicle further in the lane. The washing unit 6 automatically completes the washing and rinsing of the vehicle front end. When that is completed, the signal light turns "green." This authorizes the advance of the vehicle along the lane A to the second "stop station," as indicated in dotted outline in FIG. 2.

The first person shuts off the cleaner which retracts the door-opening embracing-hood. That being done, he would close all the doors of the vehicle and advance the vehicle to the second "stop station." He then closes the rear windows and returns to the driver seat again.

As the vehicle moves slowly forward from this first "stop position" to the second "stop station," as shown in dotted outline in FIG. 2, it activates, in succession, the 1TS and 2TS (first and second) treadle switches, as it moves across the 1PR photo relay and, continuing, contacts the 1DS, 2DS and 3DS (first, second, third dangle switches).

The tripping of 1TS initiates the operation of the pre-wet arch 30. The activation of the 1DS holds (i.e. continues) the pre-wet operation. The 2TS sets up the 1PR photo relay circuit. The 2DS starts the operation of the side and roof washing unit 7 and the rinse arch 34. The 3DS holds (i.e. continues) the operation of the initial action of the side-and-roof washing unit 7 and rinse arch 34 until the rear end of the vehicle clears the photo relay 1PR. This results in changing the signal light to "red" whereupon the driver stops the vehicle and the pre-wet and side-and-roof washing unit 7 and rinse arch are arrested. The rear end of the vehicle is thereupon in position for washing by the unit 6, in the same manner that such unit washed the front of the vehicle at the first "stop station." It is the vehicle clearing the photo relay 1PR that permits this second operation of the washing unit 6.

As soon as the rear wash cycle is completed the circuit is opened to arrest the functioning of the washing unit 6 and the signal light turns "green." The up limit switch 6LS then again turns on the side-and-roof washing facility C. The driver resumes the advance of the vehicle to take it off from the lane A. The resumed movement of the vehicle releases the 1DS dangle switch which shuts off the pre-wet arch 30 for the sides and top of the now forward moving vehicle.

The subsequent release of the 2DS dangle switch is not effective because it is being held inactive by the 3DS dangle switch. The subsequent release of the 3DS switch opens the circuit to the side-and-roof washing unit 7 and rinse arch 34 and thereby further operation is arrested.

The vehicle continues off the lane A to the desired point from the lane whereupon the second person returns to the advancing end of the lane to repeat his attention to another vehicle that has been set at the first "stop station."

The complete circuitry E with all the components requisite for accomplishing the above-described operation of this vehicle cleaning system are shown in FIGS. 6, 7, 8 and 9. The layout of the first three of these figures controls the above-described functioning of the exterior washing facilities B and C. The layout of FIG. 9 controls the above-described functioning of the dust-and-particle collecting means D.

In these respective layouts the components identified in the above-described operation are indicated in dotted circles. The "legend" of FIG. 10 identifies the components mentioned in the above operation and certain other conventional components imperative to the functioning of this system. In addition, these layouts identify by conventional forms and indicia components required to make effective the functioning of these specifically illustrated and explained items. Such circuitry diagrams will be understood readily by those skilled in the use of herein-described facilities for such a vehicle cleaning system.

Although but one specific embodiment of this invention is herein shown and described, it will be understood that numerous details of the construction shown may be altered or omitted without departing from the spirit of the invention as defined by the following claims.

I claim:
1. A system for the synchronized cleaning of the exterior and interior of passenger vehicles comprising, a predefined service lane for movement of the vehicle therealong incident to the cleaning thereof, brush-and-spray mechanisms fixed along the service lane for directing pressured impingement of detergent-mixed and rinsing liquid-sprays against the exterior, front, the sides-and-roof and the rear of the vehicle, dust and particle-collecting means fixed adjacent the service lane for operation concurrently with the exterior washing of the front of the vehicle, an expansible-contractable door-opening embracing-hood connected to the dust-and-particle-collecting means and movable into and out of fixed substantially air-tight position over the door-opening of the vehicle, a detergent-mixing and water-pressured facility connected to the spray mechanism, and switch-control circuit means connected to the spray mechanisms and the collecting means for synchronizing the washing of the front of the vehicle with the simultaneous operation of the dust-and-particle-collecting means of the interior of the vehicle.

2. A system for the synchronized cleaning of the exterior and interior of passenger vehicles as set forth in claim 1 wherein the exterior cleaning of the front and rear of the vehicle is effected by one and the same spray-mechanism when the vehicle is at spaced stations on the service lane, and wherein the cleaning of the sides and roof of the vehicle is effected during the movement of the vehicle between the spaced stations.

3. A system for the synchronized cleaning of the exterior and interior of passenger vehicles as set forth in claim 2 wherein a conveyor is incorporated into the service lane to effect the automatic advance of the vehicle between the stations on the lane and subsequently to an exit from the service lane.

4. A system for the synchronized cleaning of the exterior and interior of bus-type passenger-vehicles comprising:

(a) a predefined service lane having lane guides, a grate-covered drain trench disposed longitudinally betwen the guides, and along the two vehicle-end-washing positions,
(b) an inverted U-shaped frame spanning the service lane and anchored to the perimetrical boundaries thereof,
(c) a motor-driven spray-nozzle supporting-bar mounted for reciprocal movement down and up the frame for successively impinging detergent and rinsing sprays along the front and rear of the vehicle when stationary in successive predetermined positions in the service lane,
(d) opposed frame-supported motor-driven rotary brushes and associated detergent and washing spray-nozzles for cleaning the sides of the vehicle as it advances from the first to the second of the vehicle end-washing positions along the service lane,
(e) a motor-driven suction type dust-and-particle collecting means fixed at one side of the service lane and having an accordian-type door-opening embracing hood with means for temporary anchoring thereof over the door opening, and
(f) switch-controlled circuitry with incorporate components connected for the coordinated activation of the three aforesaid motor-driven facilities said facilities being so positioned and said circuitry being coordinated so that the front of the vehicle is simultaneously sprayed while the collecting means is in operation.

5. A system for the synchronized cleaning of the exterior and interior of bus-type passenger-vehicles as set forth in claim 4 wherein a conveyor is incorporated into the service lane to effect the automatic advance of the vehicle between stations on the service lane and off therefrom.

6. A system for the synchronized cleaning of the exterior and interior of bus-type passenger-vehicles as set forth in claim 4 wherein:

(g) a nozzle-sprayed roof mop is suspended adjacent the side washing brushes.

7. A system for the synchronized cleaning of the exterior and interior of passenger vehicles as set forth in claim 6 wherein:

(h) an inverted U-shaped frame having a series of spray nozzles thereon is positioned spanning the lane and anchored to the perimetrical boundaries thereof intermediate the motor-driven spray-nozzle supporting-bar and the frame-supported motor-driven side-cleaning brushes for pre-wetting the vehicle exterior during its movement from the respective positions, and
(i) an inverted U-shaped frame with spray nozzles spanning the service lane and anchored to the perimetrical boundaries thereof beyond the frame-supported motor-driven side-washing brushes for rinsing the vehicle as it advances along the lane and finally off therefrom.

References Cited

UNITED STATES PATENTS

| 3,089,168 | 5/1963 | Blanford | 134—123 XR |
| 3,134,117 | 5/1964 | Frank et al. | 134—123 XR |
| 3,258,019 | 6/1966 | Bellas et al. | 134—123 XR |

FOREIGN PATENTS

| 721,450 | 1/1955 | Great Britain. |
| 961,995 | 6/1964 | Great Britain. |

ROBERT W. MICHELL, *Primary Examiner.*